United States Patent [19]

Shawcross et al.

[11] Patent Number: 4,690,520
[45] Date of Patent: Sep. 1, 1987

[54] APPARATUS FOR USE IN TRANSPORTING A PHOTOGRAMMETRIC MICROSCOPE FROM A FIRST POSITION TO A SECOND POSITION

[75] Inventors: Alfred L. Shawcross, Lima; Donn E. Stevens; Robert E. Jones, both of Rochester, all of N.Y.

[73] Assignee: Bausch & Lomb Incorporated, Rochester, N.Y.

[21] Appl. No.: 859,511

[22] Filed: May 5, 1986

[51] Int. Cl.$^4$ .................. G02B 21/22; F16M 11/04
[52] U.S. Cl. ................................. 350/517; 350/136; 350/143; 248/651; 269/309; 108/143
[58] Field of Search ............... 350/517, 507, 514, 515, 350/516, 135-138, 143, 133, 130; 108/143, 137, 20; 248/651, 298, 323, 122; 198/345; 269/309, 310

[56] References Cited

U.S. PATENT DOCUMENTS 4,328,713  5/1982  Lund .................................. 350/515
4,356,904  11/1982  Siarto ................................. 198/345

Primary Examiner—Jon W. Henry
Attorney, Agent, or Firm—John S. Norton

[57] ABSTRACT

A slide mechanism for use in transporting a stereoscope along a horizontal support arm of a photogrammetric instrument includes a member slidably mounted to a pair of support tracks cantilevered to the support arm. A clamping mechanism is used to lock the slide member in a first predetermined position on the support tracks and is unlockable to enable the slide mechanism to be moved along the support tracks to a second position.

12 Claims, 7 Drawing Figures

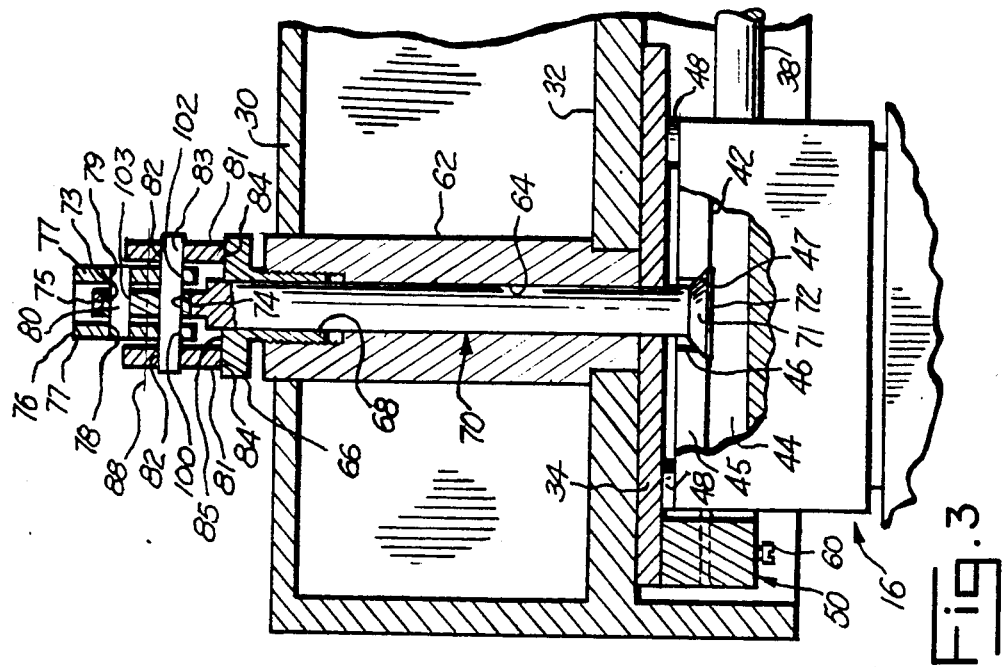
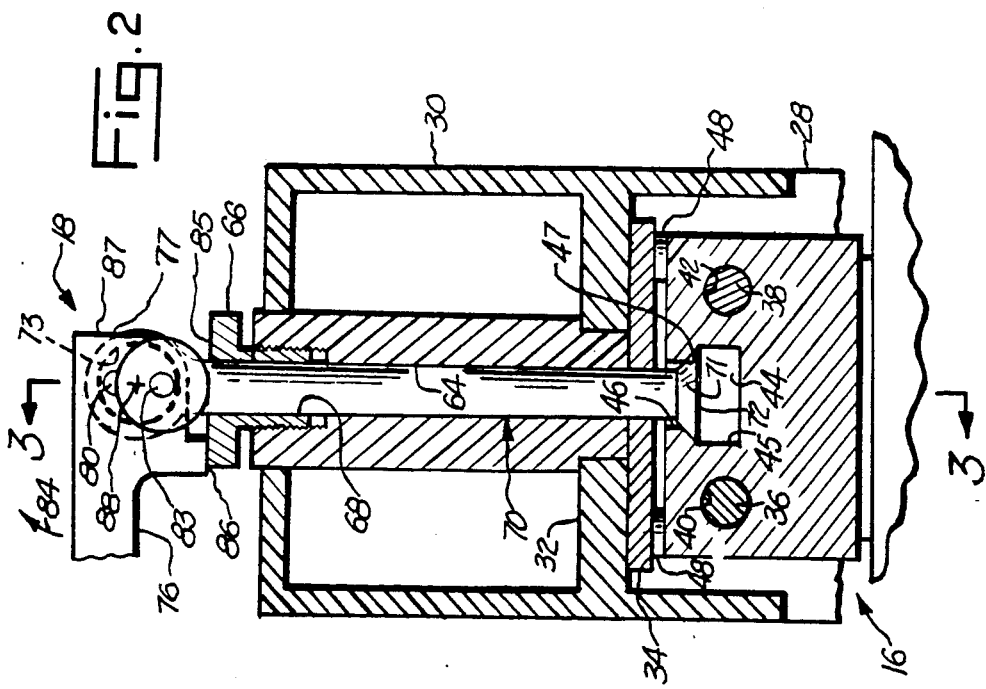

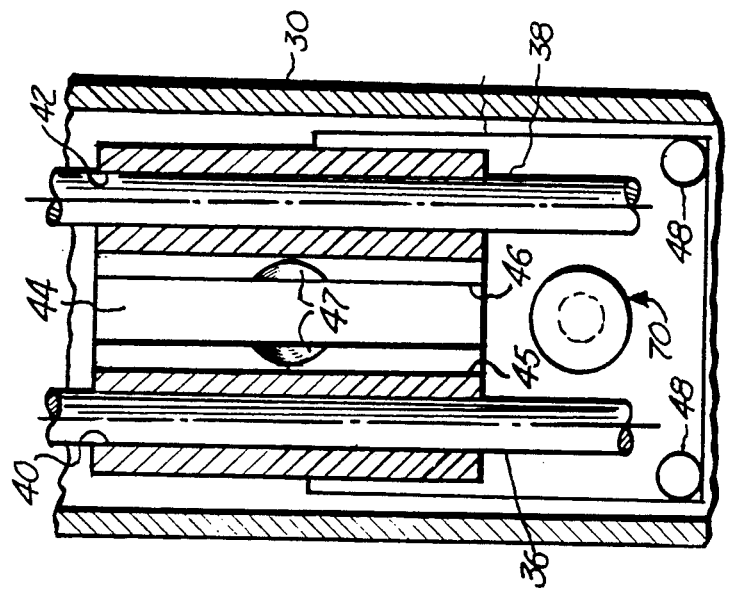
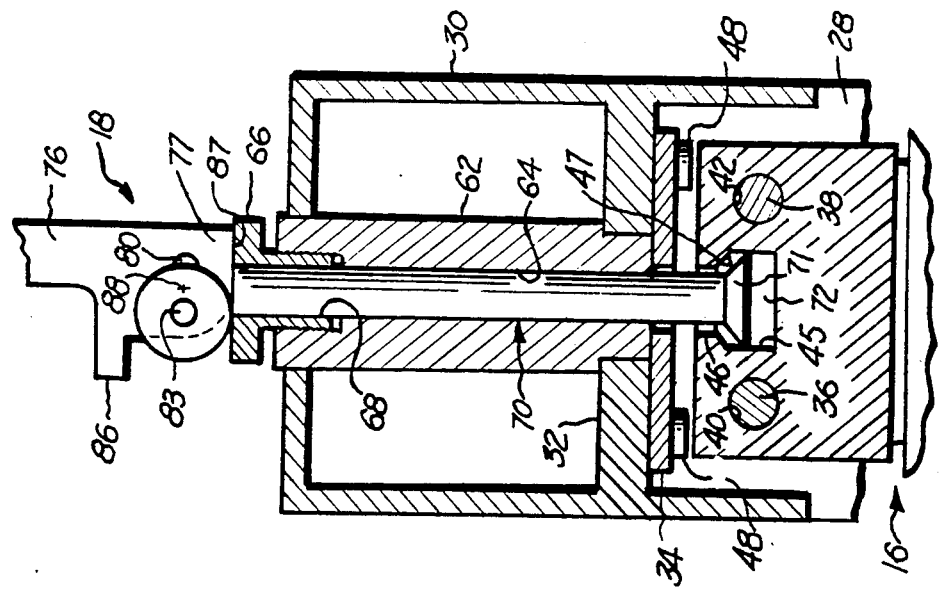

APPARATUS FOR USE IN TRANSPORTING A PHOTOGRAMMETRIC MICROSCOPE FROM A FIRST POSITION TO A SECOND POSITION

BACKGROUND OF THE INVENTION

1. Field of the Invention

This invention relates to a mechanism which enables the operator of a photo interpretation instrument to move a stereoscope from its normallY fixed position directly over the photograph(s) supported and illuminated by a light table to a second position which permits the operator to view the photographs with the unaided eye.

2. Description of the Prior Art

The process of interpreting or inspecting aerial photographs typically requires the use of instrumentation including a light table for supporting and illuminating the photographs, and appropriate viewing optics, such as a stereoscope, which is supported above the light table. The stereoscope typically includes a pair of rotatable rhomboid arms attached thereto. The photographs being studied are supported upon a flat translucent surface provided on the light table. In some instances, the photographs may be moved, as necessary, across the translucent surface from a supply roll to a take up roll. The Bausch & Lomb Zoom 240 TM and Zoom 500 TM image analysis systems are examples of such instrumentation.

By monoviewing one of a pair of stereo photographs through the optics of one of the rhomboid arms of the stereoscope, the operator determines where on a particular frame of the film the desired area to be inspected is located. By monoviewing through the optics of the other rhomboid arm, the adjacent (stereo) photo is similarly inspected. When the operator is satisfied that the desired areas of the stereo pair of photographs are similarly positioned, the instrument is switched from a mono mode to stereo. The operator is now able to analyze the pair of photos in stereo.

Many times during the examination and study of the selected area on the photographs, it becomes necessary for the operator to view the photos without the aid of the stereoscope. When utilizing a system which permits movement of the stereoscope in both x and y directions relative to the light table, the operator merely pushes the stereoscope to a remote location to directly view either one or both of the stereo pair of photos. However, in order to resume microscopic examination of the previously examined areas of the photos, the operator must manually relocate the stereoscope exactly over the prior location. This can be a time consuming and laborious task.

Should the operator be inspecting photos with the aid of an instrument having fairly high magnification, the task of direct, unaided viewing becomes quite onerous as the stereoscope is fixed to the table and the rhomboid arm's objectives are positioned immediately above the photos. It is, therefore, necessary to move the film from under the stereoscope in order to view the desired areas. The higher the magnification, the more difficult this becomes as the areas being examined represent a very small portion of the photograPh which makes repositioning those specific areas under the stereoscope in exactly the same position as before quite difficult. This is due to the fact that the operator may not be readily able to tell, once, the photo is moved, exactly where on the photo the desired area is located.

Other types of photogrammetric viewing instruments, which involve movement of the stereoscope with respect to the light table, are shown in U.S. Pat. Nos. 2,692,531 issued Oct. 26, 1954 to E. N. Waterworth et al and in 3,267,798 issued Aug. 23, 1966 to G. L. Hobrough et al. The Waterworth et al device shows a stereoscope mounted to a frame which is adjustable in the x and y-directions relative to the light table. The stereoscope is further mounted to a supPort beam by way of a parallel link mechanism which allows additional movement in the z-direction. When it becomes necessary for the operator to view the stereo pair of photos without the aid of the stereoscope, it must be moved from one position to another, either by sliding it in the x or y-directions, or by raising it in the z-direction. As no means are provided on the instrument to ensure exact repositioning, it is evident that refocusing is required.

The device shown in the Hobrough et al patent discloses a stereoscopic viewing station that is supported above a viewing table by way of pivotable arms which may be utilized to either raise or lower the stereoscope. This device is similar to the Waterworth et al instrument as the stereoscope must be refocused frequently when it is moved from one position to another with respect to the viewing table.

It will, therefore, be appreciated that a mechanism which would enable an operator to stereoscopically view stereo pairs of photos supported on a photogrammetric light table and then move the stereoscope, so that the photos may be manually viewed, and to then exactly reposition the stereoscope to resume microscopic examination of the precise area previously viewed is desirable. The apparatus of the present invention, provides such a mechanism.

BRIEF SUMMARY OF THE INVENTION

The present invention is directed toward an apparatus for supporting and horizontally transporting an optical instrument above an object being viewed. The apparatus includes a slide member to which the instrument is mounted. The slide member is slidably mounted to a guide mechanism supported by a support arm and is movable therealong from a first position to a second position. The apparatus further includes a clamping mechanism to lock the slide member to the support arm. The clamping mechanism is, preferably, adjustable. Additionally, the apparatus may include a means for limiting deflection of the guide mechanism when in the unlocked mode.

BRIEF DESCRIPTION OF THE DRAWINGS

FIG. 2 is a sectional view taken along line 2—2 of FIG. 1;

FIG. 3 is a sectional view taken along line 3—3 of FIG. 2;

FIG. 6 is a view similar to FIG. 2 showing the clamping/adjusting mechanism in an unclamped mode; and FIG. 7 is a sectional view taken along line 7-7 of FIG. 6 showing the slide mechanism in a second position remote from the position shown in FIG. 4.

DETAILED DESCRIPTION OF THE PREFERRED EMBODIMENT

Figure 1:
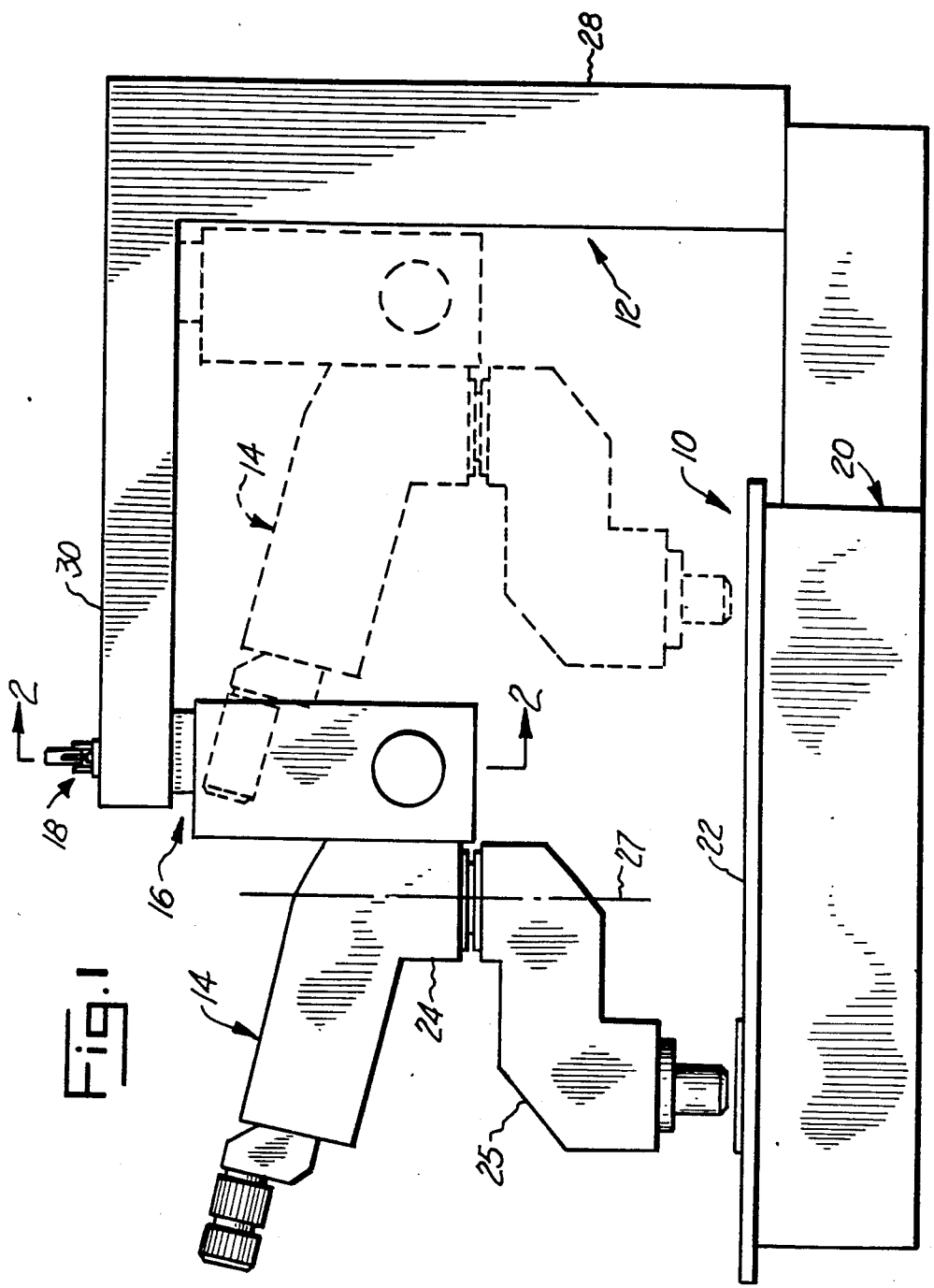
FIG. 1 is a simplified side view of one embodiment of the apparatus of the invention showing the stereoscope in an active first position over the film being viewed and in a second position remote from the first position.

FIG. 1 of the drawings illustrates, in simplified form, a photogrammetric light table 10 having a support member 12 from which a stereoscope 14 is suspended by a slide mechanism 16 whih is fixed to support member 12 by clamping assembly 18. Light table 10 includes a light box 20 having a source of illumination (not shown) fixed therein and a translucent stage 22.

The stereoscope 14 includes a housing 24 and a pair of rhomboid arms, one of which is shown at 25. The rhomboid arms 25 are pivotally coupled to the stereoscope housing 24 so that they may be rotated about axis 27.

Figure 5:
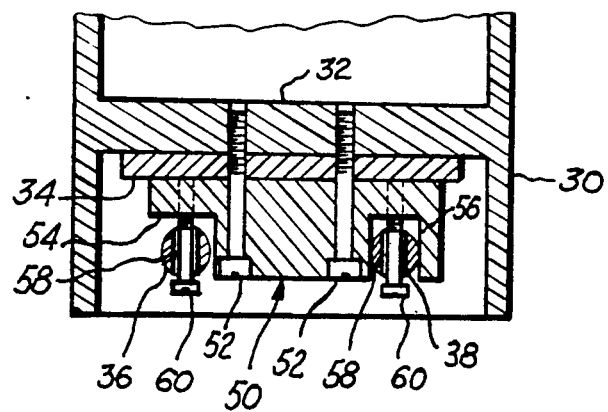
FIG. 5 is a sectional view taken along line 5—5 of FIG. 4.

The support member 12 includes a vertical pedestal 28, which is firmly secured to the light table 10, and an arm 30 which extends horizontally above the light box 20. As is best illustrated in FIGS. 2, 3 and 5, arm 30 includes an internal rib 32. Rib 32 has a positioning block 34 formed thereon substantially horizontal to stage 22.

A pair of parallel flexible support tracks 36 and 38, which preferably are cylindrical rods, are secured by any conventional means to vertical pedestal 28. Tracks 36 and 38 extend horizontally in arm 30 below block 34. As best seen in FIG. 2, slide mechanism 16 has a pair of parallel bores 40 and 42 formed therein along which tracks 36 and 38, respectively, are slip fit. A Tee-shaped slot 44 having legs 45 and 46 is formed in slide mechanism 16 intermediate between bores 40, 42. A conical bore 47 intersects Tee-shaped slot 44. Slide mechanism 16 further includes a trio of locating pads 48 arranged in a triangular pattern, as best seen in FIG. 4.

Figure 4:
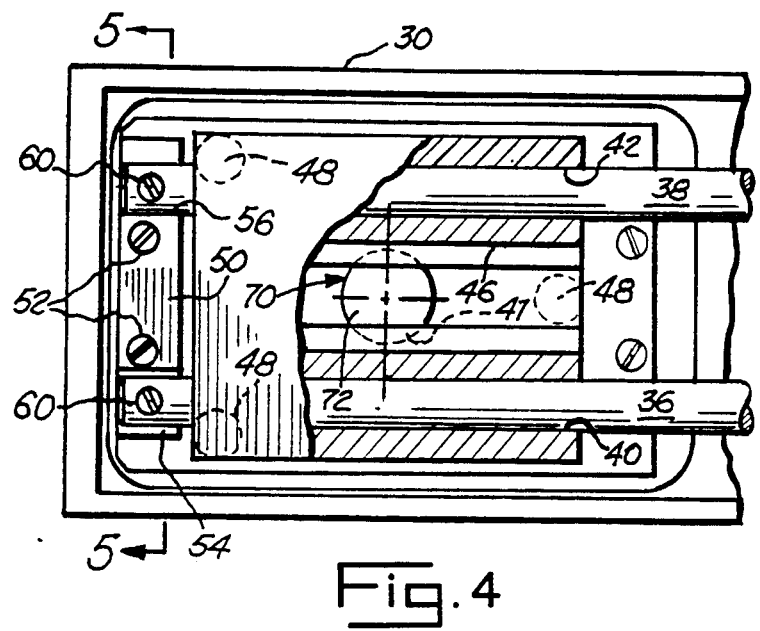
FIG. 4 is a partially sectioned bottom plan view thereof.

A locating member 50 is fixed to positioning block 34 by way of screws 52, as best illustrated in FIGS. 4 and 5. Locating member 50 includes a step 54 and a slot 56. Support track 36 is juxtaposed to step 54 and support track 38 is received within slot 56. Each support track includes a bore 58. Screws 60 are fitted through bores 58 and threaded into positioning block 34, as shown in FIG. 5. Clearances are left between the heads of screws 60 and the support tracks 36, 38, as well as between the shanks of the screws 60 and the bores 58. The clearances permit the flexible support tracks 36, 38 to deflect, both laterally and downwardly, a preselected amount, the importance of which will be detailed hereinafter.

Clamping assembly 18 is fixed to horizontal arm 30 and includes a sleeve 62, having a bore 64, a bushing 66, having a bore 68, threadably received within sleeve 62, and a rod 70 which is slidably received in bores 64 and 68. Rod 70 includes a conically tapered surface 71 at one end 72 and a cylindrical eye 73 at the other end. A cylindrical bushing 75 is rotatably mounted in eye 73 of rod 70. A clamp handle 76 has a bifurcated end 77 which straddles the cylindrical eye 73 of rod 70 and bushing 75, as best seen in FIG. 3. The bifurcated end 77 includes a pair of coaxial bores 78, 79. Bushing 75 further includes a bore 103 which is coupled to bores 78 and 79 by means of pin 80. Approximately 180° from bore 103 is a second parallel bore 74 through bushing 75. Coaxial bores 100 and 102 through the bifurcated end 77 align with bore 74. Pivot Pin 83 passes through bores 100, 74 and 102 effectively locking bushing 75 to the bifurcated end 77 of clamp handle 76. A pair of cylindrical rollers 81 are positioned outboard of the bifurcated end 77 of handle 76. Each roller includes a concentric bore 82 which allows rollers 81 to rotate freely about the extended ends of pivot pin 83. The periphery 84 of each roller 81 is in contact with surface 85 of bushing 66. The bifurcated end 77 further includes a stop lug 86 and stop surface 87, as best seen in FIGS. 2 and 6.

In order to move the stereoscope 14 from the viewing position to the stowed position, the clamping mechanism 18 must be unlocked which releases the slide mechanism 16 from engagement against positioning block 34 of arm 30, thereby allowing it to be moved along support tracks 36 and 38. In the locked position, stop lug 86 engages bushing surface 85 thereby preventing handle 76 from over rotating. To unlock clamping mechanism 18, the handle 76 is rotated in the direction of arrow 84 from the locked position shown in FIG. 2 to the unlocked position shown in FIG. 6. When handle 76 is rotated, pins 80 and 83 rotate in an arc about axis 88, as best seen in FIG. 3. As rod 70 is pivotally connected via bushing 75 to pins 80 and 83 and constrained against radial movement by bores 64 and 68, when handle 76 is rotated, it will move in a vertical direction from, for instance, the locked position shown in FIGS. 2 and 3 to the unlocked position shown in FIG. 6. The rollers 81, which are rotatably fixed to pivot pin 83, Provide low-friction rolling engagement with the bushing surface 85. Accordingly, wear is essentially eliminated.

Upon release of the clamping mechanism 18, the slide mechanism 16 drops from engagement against positioning block 34 and locating pads 48. The weight of the suspended mass of the stereoscope 14 and slide mechanism 16 causes the support tracks 36, 38 to deflect downwardly a predetermined amount. In turn, the tapered portion 71 of rod 70 drops from engagement with conical bore 47 a distance sufficient to clear leg 46 of Tee-shaped slot 44, as illustrated in FIG. 6. The release of clamping mechanism 18, combined with the deflection of tracks 36 and 38, is sufficient to permit slide mechanism 16 to be spaced far enough from block 34 to enable its free movement back and forth in slot 44 along tracks 36, 38. However, to ensure that tracks 36 and 38 do not deflect past a preselected point, the previously mentioned heads of screws 60 will act as stop shoulders against which the tracks 36 and 38 may abut. Stop surface 87 engages bushing surface 85 thereby preventing over-rotation of handle 76.

Additionally, to protect against any deflection of the tracks 36 and 38 from side to side, support track 38 is captured, as previously described, by slot 56 of locating member 50.

Once the clamping mechanism 18 has been unlocked, the stereoscope 14 may be slidably moved to the stowed position, such as is shown in dotted lines in FIG. 1, to enable the operator to view the desired areas of the photos with the unaided eye. After viewing, the stereoscope 14 can be easily pulled back to the approximate position it previously occupied at the end of arm 30. As previously described, to reposition the stereoscope exactly, when clamping mechanism 18 is locked, the tapered surface 71 of rod 70 self-centers and seats precisely into conical bore 47 of slot 44. As the rod 70 is accurately held in bores 64 and 68, allowing only for up and down movement, no free play is permitted in either the x or y-directions. Further, the previously described triangular relationship of the locating pads 48 to each other assures that the slide mechanism 16, and therefore the stereoscope 14, is kinematically correct when in the locked position. Therefore, it will be appreciated that accurate positioning of the stereoscope for viewing is repeatable time after time.

In order to set the pressure exerted by the clamping assembly 18 upon the slide mechanism 16, bushing 66 is threaded to sleeve 62 so as to be adjustable, either in or out. The distance between the surface 85 of bushing 66 and taper 71 of rod 70 is, therefore, adjustable. This effectively alters the length of rod 70 which, in turn, effects this clamping force which may be exerted by clamping assembly 18 on slide mechanism 16.

Although a specific embodiment of this invention has been set forth in considerable detail in the foregoing specification there are numerous changes which could be made thereto without departing from the spirit or the scope of the invention as set forth in the following claims appended hereto.

We claim:

1. Apparatus for permitting movement of a microscope suspended by a horizontal support arm of an optical instrument from a first fixed position over an object to be viewed to a second position, comprising:

guide means affixed to the horizontal support arm and extending substantially horizontally above the object;

slide means having a microscope mounted thereto, said slide means being slidably mounted to said guide means; and clamping means affixed to the horizontal support arm for locking said slide means to the horizontal support arm in a preselected first position along said guide means and for unlocking said slide means from the horizontal support arm to enable said slide means to be moved along said guide means to a second position, said clamping means including a first member for pivotal engagement with a surface formed on the horizontal support arm and a second member pivotally connected thereto, said second member being releasably received within a longitudinal slot formed within said guide means.

2. The apparatus as set forth in claim 1 wherein said first member incudes means cooperative therewith for providing low friction pivotal engagement with the surface formed on the horizontal support arm.

3. The apparatus as set forth in claim 3, wherein said low friction means comprises at least one roller.

4. The apparatus as set forth in claim 1, wherein said longitudinal slot formed within said guide means includes means therein for receiving and positioning said clamping means second member in a clamped state when said slide means is in a preselected reference position above the object being viewed.

5. The apparatus as set forth in claim 4, wherein said clamping means includes a conically tapered end and said means in said longitudinal slot for receiving and positioning said clamping means second member comprises a conical bore for receiving said conically tapered end.

6. The apparatus as set forth in claim 4, wherein said first member is adjustably fixed to said second member.

7. The apparatus as set forth in claim 4, and further including means adjustably mounted to the horizontal support arm between said first and second member for adjusting the pressure exerted by said second member against said longitudinal slot formed within said guide means.

8. The apparatus as set forth in claim 4, wherein said guide means comprises a pair of support tracks cantilevered from the optical instrument essentially parallel to the horizontal support arm.

9. The apparatus as set forth in claim 8, wherein said pair of support tracks are flexible.

10. The apparatus as set forth in claim 9, and further including means coupled to the horizontal support arm for preventing deflection of said support tracks beyond a predetermined point when said slide means is unlocked.

11. The apparatus as set forth in claim 10, wherein said means for preventing deflection of said support tracks comprises at least one locating member juxtaposed to at least one of said support tracks and affixed to the horizontal support arm, said locating member including a shouldered portion thereon to prevent deflection of said at least one cantilever support track past a predetermined point.

12. The apparatus as set forth in claim 10, wherein said means for preventing deflection of said support tracks comprises a locating member affixed to the horizontal support arm adjacent said support tracks and at the opposite end from the mounting point thereof, said locating member including first means for preventing the horizontal deflection of said guide means and second means for preventing vertical deflection of said guide means.

* * * * *